July 13, 1965  B. A. RUBIN  3,194,237
PRONGED VACCINATING AND TESTING NEEDLE
Filed Oct. 5, 1962  2 Sheets-Sheet 1

INVENTOR
BENJAMIN A. RUBIN
BY
Andrew Kaffco
ATTORNEY

July 13, 1965  B. A. RUBIN  3,194,237
PRONGED VACCINATING AND TESTING NEEDLE
Filed Oct. 5, 1962  2 Sheets-Sheet 2
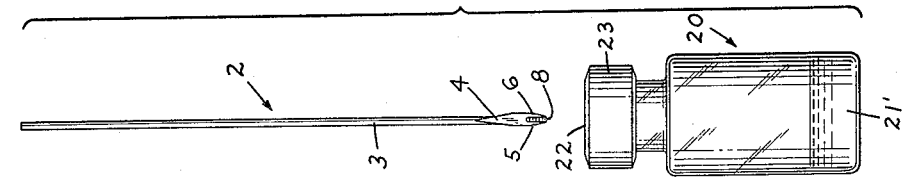
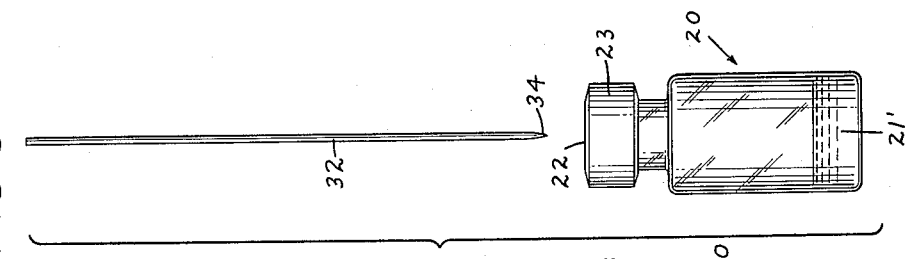
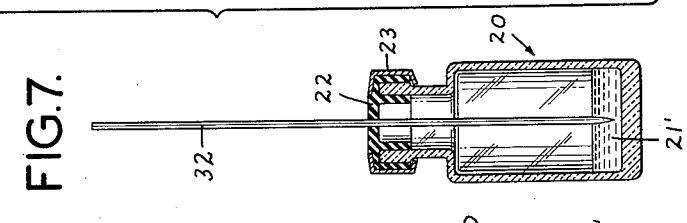
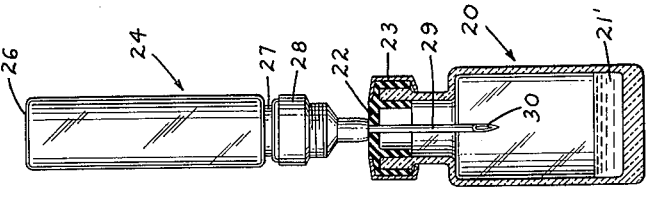
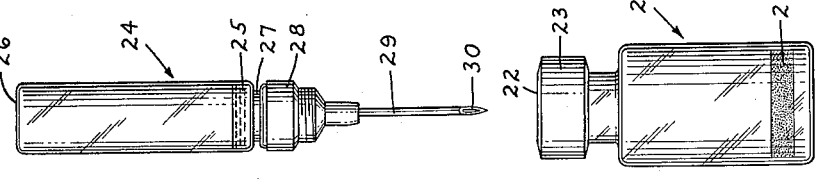
INVENTOR
BENJAMIN A. RUBIN
BY
Andrew Kafko
ATTORNEY 3,194,237
PRONGED VACCINATING AND TESTING
NEEDLE
Benjamin A. Rubin, Bala Cynwyd, Pa., assignor to American Home Products Corporation, New York, N.Y., a corporation of Delaware
Filed Oct. 5, 1962, Ser. No. 228,619
6 Claims. (Cl. 128—253)

The present invention relates generally to medical applicator instruments and more particularly to vaccinating and testing needles of generally simple construction for use by the medical and related professions.

Vaccinating and testing needles of both the solid and cannula types have been in long use by the medical and related professions. As far as is known, all the previous devices of the simple solid category have had in common the characteristic of a single-point needle made of any of a variety of materials, but most usually of steel. Conventionally, the prior methods of use of such needles comprise immersing them in a vaccine or solution of antigen and then applying the wetted needle directly to the epidermis of the subject, or in other instances permitting the solution to dry under aseptic conditions and using the applicator at a later time at which the dried material is reconstituted by addition of an appropriate liquid. As will readily appear, with these prior art devices comprising a single-point needle, and in the methods of use thereof, the amount of vaccine or other solution taken up at the time of immersion varies with the depth of immersion of the needle, the cleanliness thereof, the physical characteristics of the solution including viscosity coherency and adherency, the amount and nature of the motion of the needle in the solution and when it is withdrawn therefrom, and other similar factors. Moreover, the smooth surfaces of the single-pointed needles are not well adapted to retain the dried material in intact condition. Accordingly, it has been quite impossible to ascertain with any degree of accuracy or assurance how much vaccine, antigen, or other material to be applied or tested is held on the single-pointed needle in the wet or the dry state. In those instances where a plurality of such needles have been assembled in a single instrument for the intended purpose of handling a greater amount of a substance to be applied per single manipulation; the needles, each performing its separate immeasurable applicator function as referred to above, have in the past enhanced the problem due to the multiplication of the factor of unpredictability inherent in the use of a single such needle.

The usual processes of vaccination as done by physicians with the use of the single-pointed needles of the prior art, frequently fail to yield a positive vaccination "take." Although this may be due to the use of poor vaccine, in the vast majority of cases, the negative results are due to improver vaccination technique. The problem with respect to use of a poor vaccine may be overcome by merely substituting a commercially available effective vaccine therefor. The problem with respect to improper vaccination technique is not easily surmountable when the vaccinating needles of the prior art are used. An explanation of the probable reasons for this is given below.

Vaccination has been widely believed to be an all or none phenomenon, and in order to make vaccination more attractive cosmetically and otherwise, many physicians have aimed for a smaller and smaller primary take. However, the eminent authority on smallpox vaccination, Dr. C. Henry Kempe has observed that the degree of immunologic response does depend on the quantity of virus multiplying in the skin and regional subcutaneous and lymphoid tissues. "Studies on Smallpox and Complications of Smallpox Vaccination"—Pediatrics 26:176, 1960. Dr. C. W. Dixon, in his book "Smallpox," J. & A. Churchill Ltd., London, 1962 (dist. in the U.S. by Little, Brown and Company, Boston) refers at page 134 to the long recognition of the fact that the casual vaccination will normally succeed in obtaining desirable vaccination "takes" in no more than 80% of the subjects treated.

The conventional technique of vaccination is to put a drop of vaccine on the skin either from a capillary tube or a syringe. An ordinary single-pointed straight needle from a sterile capillary is then applied. For proper vaccination, the needle should be pressed against the skin parallel to the plane of the skin. The tip of the needle should rest in the drop of vaccine and this tip has to be pressed firmly against the skin approximately twenty times. The excess vaccine is then uneconomically wiped off. The skin should show a small red area, preferably approximately one-eighth inch in diameter, but no blood. Unfortunately, the very nature of the prior art single-pointed needles is conducive to various errors in technique. The usual error is that the needle is not pressed against the skin firmly enough, or else it is actually jabbed into the skin point forward. Either of these methods will yield a poor vaccination.

Another problem engendered by the use of the single-point needle is that such needles are, as a practical matter, generally restricted to use in on-the-spot applications. That is to say, they may not conveniently have applied thereto a predetermined charge that may be dried and retained substantially intact until the time of use for the reasons referred to hereinbefore. Hence, they are often employed in techniques involving immersion into open-topped bottles or other containers of the vaccinating or testing liquid at the time of application. The liquid in such containers is of course subject to contamination by being exposed to atmosphere, and this situation is worsened during the time of repeated immersions of a series of needles, such as may occur in on-the-spot vaccinating or testing operations with respect to a plurality of subjects. While bottles or vials are in use that have rubber diaphragm covers or stoppers which may permit sterile introduction therethrough of reconstituting liquid via a needle attached to a fluid-tight tube, attempts to use such diaphragm stoppered bottles by the introduction of the applicator needles of the prior art have proven abortive. The reason is simply that a single needle or a plurality of separate needles, after insertion through the diaphragm for wetting by the substance within the sterile bottle or vial, is wiped clean when such needle is withdrawn through the diaphragm.

With the foregoing drawbacks and disadvantages of the prior art devices and methods of use in view, it is a primary object of the present invention to provide a medical applicator needle of simple and economic construction that will nevertheless pick up a constant and reproducible amount of vaccine or test substance upon mere immersion thereof.

It is another object of the invention to provide an applicator device with which the constant amount of substance picked up thereby does not vary in accordance with the depth of immersion of the device into the solution of said substance or because of other variable factors including characteristics of the solution and manipulations by the user.

It is another object of the invention to provide such device which retains the material picked up in the wet form or maintains such material in the dry form after the wet form is dried in situ, and retains the dry form during transportation and storage, for example.

It is another object of this invention to provide a device with a dried charge ready for reconstitution and hermetically sealed in sterile condition within a glass capsule which is frangible at a predetermined point to permit exposure of the applicator end for use and at the same time to provide a handle at the other end of the applicator that is not subject to contamination by the dried material.

Another important object of the invention is to provide a vaccine applicator that, because of its unique configuration, is conducive to the use of proper vaccination technique, which may be acquired even by those not especially skilled in the art.

Yet another object is to provide a vaccine applicator as described which, upon use, substantially assures a positive vaccination "take," with the utilization of a minimum, and hence economical, amount of vaccine.

It is another object of the invention to provide a sterile package applicator combination wherein a plurality of the applicators may be introduced one after the other into the sterile container for charging and then withdrawn for use without adversely affecting the sterile condition of the contents of the container.

The above and other objects and advantages of the invention will appear from the description thereof that follows.

Generally, the present invention resides in the provision of a vaccinating and testing needle comprising a main shank having at one extremity thereof a pair of prongs defining therebetween a slot of predetermined length, width and depth adapted to maintain therein by capillary action a predetermined amount of liquid. Preferably the shank is elongated so that it may function as a handle for the needle. When the device is to be stored or packed under aseptic conditions after application of the liquid, which may be a vaccine, test material or similar substances; the prongs and slot, which are adapted to maintain the predetermined amount of liquid charge, are also adapted to maintain the residual dry cake resulting from drying of the charge. This feature of the present device makes it admirably suited for storing a charge on the applicator until it is required for use. At such time, the dry cake may be reconstituted to a flowable charge by addition of a minute amount of reconstituting fluid preferably by putting a drop of the fluid on the skin and then touching the tip of the needle to the drop of fluid. This immediately dissolves the dried vaccine held in the fork and the vaccination can then proceed.

To store the device having the dried charge thereon, it has been found advantageous to seal such device within evacuated frangible glass capsules which may be broken and removed to uncover the device at the time the needle is to be used. However, it has been found that in sealing the device with the dry cake between the prongs, the danger exists that minute particles of the cake may come off the main charge and contaminate the handle portion of the device with resultant inherent danger to the operator who may grasp the contaminated handle portion, and even worse, transmit the contamination by touching another part of his or another's person. Accordingly, it has been found most advantageous in those cases where the device is sealed within an evacuated glass capsule to have the elongate shank of the device clamped by or adhered to the capsule at the handle end, and provided with a predetermined point of breakage whereby the pronged end of the device retaining the caked vaccine may be bared for use while the remainder of the glass capsule still attached at the elongated end of the shank of the device, is adapted to function as a non-contaminated handle for the device.

As already pointed out herein, and with reference to present literature, it appears that smallpox vaccinations are not all equivalent. The greater the reaction, the greater is the protection from smallpox. A minimal reddening caused by a vaccination gives only a minimal amount of protection and the vaccinator should strive for the best possible reaction that can be achieved in a given patient. Of course usually the vaccinator does not know what the patient's capability of reacting is. Tests show that patients respond with much greater reactions to the forked needle of the present invention than to the ordinary vaccination technique even when done by an expert.

In certain presently known applications, the vaccine or other medicament is provided in dried powder or cake form in an evacuated vial having a diaphragm closure of a penetrable material such as rubber. Reconstitution of the dried material is achieved by introduction of a suitable reconstituting liquid into the evacuated vial containing the powder via the penetrable diaphragm. This is conventionally accomplished by means of a sealed tube containing the small amount of reconstituting liquid necessary for the purpose and having mounted at one end thereof a hollow puncturing needle closed and maintained in aseptic condition by a rubber sheath of the kind usually used for the same purpose on the needles of hypodermic syringes. When reconstitution of the dried material in the vial is desired, the sheath is removed from the hollow puncturing needle and the latter is then inserted through the diaphragm of the vial. The vacuum in the vial then draws the liquid from the tube via the hollow needle. In the event the vacuum in the vial is insufficient to overcome the partial vacuum being caused in the tube, the latter is warmed, as by a lighted match, to cause expansion of the gaseous phase (such as air) in the tube to augment the liquid-evacuating action of the vial on the tube. Normally, to use the reconstituted material in the vial, the diaphragm cover thereof must be removed to permit access to the material with the usual needle applicator. This, of course, exposes the material to possible contamination. If, on the other hand, an attempt is made to load a single-point needle without removing the diaphragm closure of the vial, as by insertion of the needle through the diaphragm and into the liquid material in the vial, there results merely a wipe-off of the material as the needle is withdrawn through the diaphragm for use.

Surprisingly, it has been found that the novel double-pronged needle of the invention may be inserted through the usual diaphragm closure of a vial containing a liquid material and then may be withdrawn with the desired predetermined charge still remaining thereon between the prongs and that this operation may be repeated through the same diaphragm by the use of other similar double-pronged needles.

Several preferred embodiments of the invention are disclosed in the following description and in the drawings appended hereto. It will be understood that the description and drawings are intended to be illustrative only and not to limit the invention, the scope of which is defined in the appended claims. Referring now to the drawings:

FIG. 5 is a side elevation of an assembly of the prior art comprising an evacuated vial sealed with a diaphragm closure and containing a dried material to be reconstituted, and a sealed tube containing reconstitution liquid and equipped with a puncturing hollow needle, the assembly being shown about to be used;

FIG. 6 is a side elevation of the assembly of FIG. 5 in operative relationship with the vial in vertical section to show the puncturing hollow needle of the tube through the diaphragm of the vial and the dried material therein reconstituted by the liquid provided by the tube;

FIG. 7 is a vertical cross-section of the vial of FIG. 6 with a single-pointed needle of the prior art inserted through the diaphragm of the vial and into the pond of reconstituted liquid material in the vial;

FIG. 8 is a side elevation of the vial and needle of FIG. 7 but with the needle withdrawn from the vial to show the needle wiped substantially clean;

FIG. 9 is a vertical cross-section of the vial of FIG. 6 but with a double-pronged needle of the present invention inserted through the diaphragm of the vial and into the pond of reconstituted liquid in the vial; and FIG. 10 is a side elevation of the vial and needle shown in FIG. 9 but with the needle withdrawn to indicate the presence of the charge remaining on the needle after withdrawal through the diaphragm of the vial.

Figure 1:
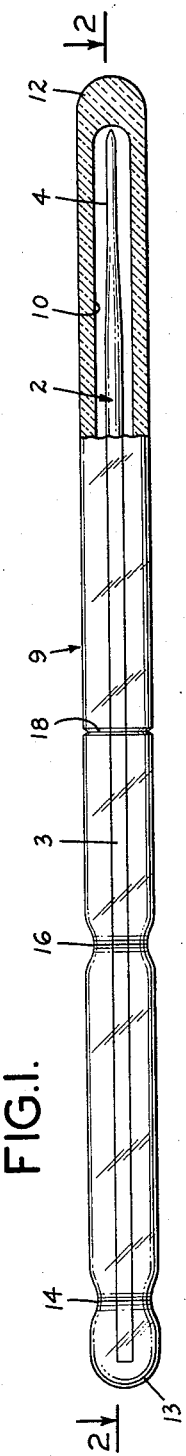
FIG. 1 is a side elevation of a preferred embodiment of the device of the invention enclosed in a glass capsule, part of which is shown broken away at the end thereof encasing the pronged end of the applicator.
Figure 2:
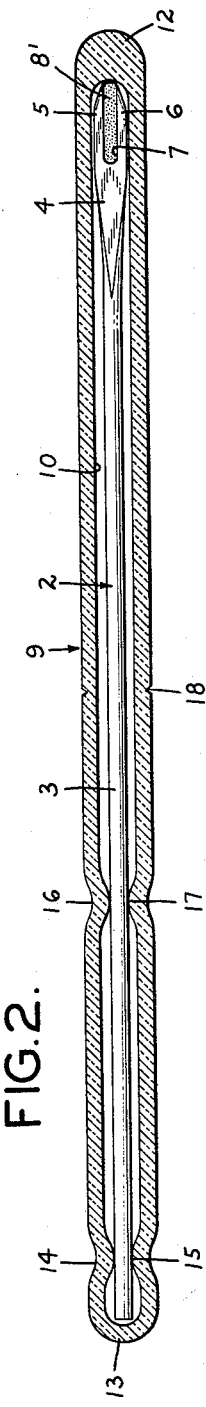
FIG. 2 is a longitudinal cross-section of the capsule and device therein of FIG. 1 taken along lines 2—2 thereof, and showing the dried charge retained between the prongs of said device.
Figure 4:
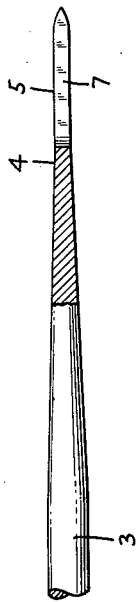
FIG. 4 is a lateral view of a portion of the device shown in FIG. 3 but with part of the end of the device including one prong broken away to disclose the interior of the slot between the prongs.

Referring to FIGS. 1 and 2, this preferred embodiment of the invention comprises an applicator device or needle 2 having an elongate generally cylindrical shank 3 and integral therewith an end 4 of generally flat configuration of a thickness that is less than the diameter of the cylindrical shank and a width (FIG. 2) that is generally greater than said diameter of said cylinder portion. The flat wider portion has two prongs or tines 5 and 6 sharpened at their extremities and spaced from each other to form a slot 7 therebetween. In this embodiment of the invention, there is maintained in the slot 7 between the prongs 5 and 6 a charge of caked material 8 which may be a vaccine or a testing substance resulting from the drying of a liquid charge previously maintained between the prongs prior to encapsulation of the applicator device 2 in a glass capsule 9 now to be described.

In this embodiment disclosed in FIGS. 1 and 2, the applicator device 2 is enclosed in the glass capsule 9 which is completely sealed at its ends 12 and 13 to enclose an evacuated space 10 in a manner referred to hereinafter. At the extremity 13 of capsule 9 adjacent the end of shank 3 of device 2 opposite pronged end 4 thereof there is a constriction 14 at which the inner surface 15 of the glass is in clamping and adhering contact with the surface of shank 3. About one-third the distance away from sealed end 13, along capsule 9 towards the end 12 thereof in which flat portion 4 of device 2 is contained, is a second constriction 16 at which the inner surface 17 of the glass is again in clamping and adhering relationship with the surface of shank 3. Approximately at the midpoint of the entire capsule 9 the glass surface thereof is provided with a bevel 18 encircling the capsule and providing a locus of frangibility.

In the preparation of the assembly disclosed in FIG. 1 and FIG. 2, the device 2, in aseptic condition, is first immersed with prongs 5, 6 down in a pond (not shown) of vaccine or other material to be taken up. Thereafter, with a predetermined amount of the liquid 8 (FIG. 3) maintained in slot 7 between prongs 5, 6 the device 2 is aseptically dried whereupon a residual cake 8' of material remains between prongs 5, 6. Charged device 2 is then inserted with the pronged end 4 first into the then open end 13 of tube 9 which is previously closed at the opposite end 12.

Tube or capsule 9 is provided long enough to encompass the entire length of device 2. Thereafter, the inner space 10 of tube 9 is evacuated and the open end 13 heat sealed. Heat is then applied at the region that the constriction 14 is desired. Upon softening of the glass in said region, the partial vacuum in capsule 9 causes collapse of the glass to form the constriction 14 shown. The second constriction 16 is similarly provided by application of heat in the chosen region and reliance upon the partial vacuum in the container to form said constriction 16. Finally, bevel 18 is formed by a suitable beveling device.

In the ultimate use of device 2, the user merely grasps capsule 9 by hand at each end thereof, and then by applying a transverse force (such as when one snaps a twig held in both hands), causes fracturing of capsule 9 at bevel 18. The portion of capsule 9 from bevel 18 to end 12 encompassing the end of device 2 having the flattened pronged portion 4 then either drops off or is easily removed to expose said pronged end 4. The remaining portion of glass capsule 9 from bevel 18 to end 13 then functions as a handle that is free of contamination by any substance that may have been contained free within capsule 9. The dried material 8' may then be reconstituted as by application of a small amount of reconstitution liquid to the pronged end in which the dried material is retained, and the device is then used in the usual manner for vaccination or testing.

Figure 3:
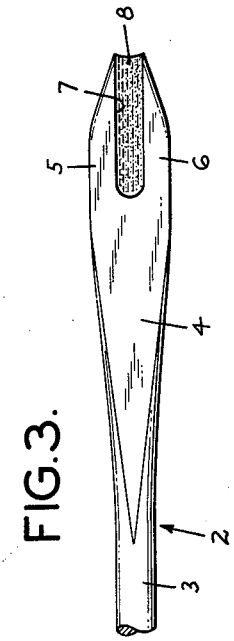
FIG. 3 is an enlarged view of the pronged end of the device shown in FIGS. 1 and 2, but in this case shown with a liquid charge between the prongs thereof.

In FIG. 3 there is shown the pronged end 4 of a device 2 similar to that shown in FIGS. 1 and 2. In this case, however, slot 7 is shown filled with a liquid material 8, the free edge of which is generally concave in the plane as viewed in FIG. 3 but is generally saddle-shaped overall, as distinguished from the dried material which curiously has been observed to have a convex edge in all planes.

FIG. 3 may be considered as representing the device 2 of FIGS. 1 and 2 either after dipping in a liquid and prior to drying and encapsulation, or subsequent to reconstitution of the dried material with a liquid. It will of course be understood that device 2 provided in sterile condition may be used directly for picking up a reconstituted or other liquid and then used directly for a vaccinating or testing operation or the like: A particular manner of such use which may be performed advantageously with the device of the present invention is now referred to below.

Referring to the embodiment of the invention illustrated in FIGS. 5–10, there is provided a vial 20 containing a dried vaccine 21. The vial 20 has been previously evacuated and a rubber diaphragm 22 applied thereto and retained thereon by a metallic (aluminum) seal 23. A diluent-cartridge 24 containing reconstituting liquid 25 is sealed at one end 26 and has attached at the other end 27 thereof by a ferrule 28 a needle 29 with the usual bore 30 therethrough and provided, for storage and transportation prior to use, with the usual rubber sheath (not shown) to prevent contamination and loss of liquid 25. In the conventional use of the assembly of vial 20 and cartridge 24 for reconstituting the material in vial 20, the rubber sheath is removed from needle 29 of diluent-cartridge 24. Then with the vial 20 and cartridge 24 positioned as in FIG. 5, the diluent-cartridge needle 29 is thrust through the rubber diaphragm 22 of vaccine vial 20. The vacuum present in vaccine vial 20 then pulls diluent liquid 25 from cartridge 24 into vaccine vial. In the event the vacuum in vial 20 has been lost or is insufficient, needle 29 may be left inserted through diaphragm 22 and the diluent 25 then caused to flow into vial 20 by heating the diluent-containing cartridge 24 with a lighted match or other source of heat. After introduction of diluent 25 into vaccine vial 20, needle 29 of diluent-cartridge 24 is removed from diaphragm 22 which then self-seals. Cartridge 24 may then be discarded and vaccine vial 20 may then be shaken to effect full reconstitution of material 21.

In the normal use of a vaccine vial such as vial 20 containing reconstituted vaccine, the seal 23 must then be torn away and the rubber diaphragm 22 removed from vial 20 to permit immersion of each needle to be used for each subject with resultant exposure to atmospheric and other contamination. On the other hand, if an attempt is made to insert a single-pointed needle 32 of the prior art through diaphragm 22 of vial 20 and into the liquid material 21' contained therein as illustrated in FIG. 7; upon withdrawal of needle 32 (FIG. 8), the natural resiliency of diaphragm 22 which is primarily relied upon for affording the desirable self-sealing qualities, here functions as an effective wipe-off for needle 32 which retains substantially no liquid on its surface adjacent point 34 for ultimate application to a subject. Hence, this latter method of use is not feasible with the single-pointed needles of the prior art.

With the foregoing in view and in accordance with one aspect of the present invention, seal 23 and diaphragm 22 are not removed from vial 20 and the aspectic condition of the contents thereof is not destroyed. Instead, each bifurcated needle 2 of the invention is inserted through diaphragm 22 and into pond 21' of liquid of reconstituted vaccine therein as shown in FIG. 9. Needle 2 is then lifted from pond 21' with a charge of liquid 8 retained in slot 7 between prongs 5, 6 and withdrawn through diaphragm 22 as in FIG. 10. With this operation, liquid charge 8 taken up in slot 7 of needle 2 is maintained for use and the perforation in the diaphragm caused by the needle is effectively resealed to maintain contents 21' of vial 20 is aseptic condition. Thereafter, needle 2 with charge 8 retained between prongs 5, 6 may be used in the usual vaccination and/or testing techniques.

It has been found that when the diaphragm is of rubber, for example, repeated insertions of different needles therethrough ultimately results in undesirable chewing up of the web of the diaphragm. This occurs particularly when a plurality of needles 2 are inadvertently inserted into a localized area of the diaphragm. Thus, it has been found that there is less chewing up of a specific area of the diaphragm if the needle insertions are dispersed over the entire area. Hence, to facilitate such dispersing of insertions, the exposed surface of the diaphragm may be provided with markings such as a printed lattice work of lines, numbers, or other indicia which may then be used as reference points for inserting a series of needles in a dispersed manner. Alternatively, such markings may be in the form of physically impressed grooves or ridges in the exposed surface of the diaphragm forming the desired indicia.

A particularly specific embodiment of the invention and method of use thereof, is admirably suited for vaccination of human subjects against smallpox, and particularly for use with the smallpox vaccine obtainable in dry form and prepared and sold under the "Dryvax" trademark by Wyeth Laboratories, Inc. Thus, a double-pronged needle found to be of particular use with the aforesaid vaccine may be of steel (such as "426 Stainless") and have a diameter of about 1.0 mm., an overall length of approximately 70 mm., the flattened portion extending for approximately 5 mm., and the prongs at their wider dimensions 1 mm. wide, 1 mm. thick, and extending to form a slot therebetween that is 1 mm. wide and 2 mm. long. With these dimensions of parts, the steel needle has been found to pick up approximately $1/1000$ cc. of water, or $2/1000$ cc. of a 50% glycerin in water solution containing 0.25% phenol, for example, on each immersion of the device, which, for best results, is dipped to at least completely above the upper end of the slot between the prongs.

The specific contour of the steel needle resulting from the dimension proportions referred to above also lends the device admirably to mass production methods. Thus, suitable automatic machinery is employed wherein a continuous cylindrical steel wire is cut to the desired lengths, the cut shanks are stamped at one end to provide the flattened (wider) portions, after which the slot is cut in the flattened portion to form the two prongs. Thereafter, the double-pronged needles may be polished and the prongs thereof sharpened by conventional tumbling procedures to provide the final articles.

Another surprising and most important characteristic of the forked needle described above is that with it there is substantially invariably performed an easier and much more successful method of vaccination than is possible with the conventional single-pointed needle. This has been confirmed by comparative studies, one of which is given in the example below.

EXAMPLE

Each of 31 patients was vaccinated twice on the same upper arm at sites within approximately 7-10 cm. of each other, once with an ordinary single-pointed needle and once with a forked needle of the invention, at the same time and by the same physician, and in all cases with the use of "Dryvax" smallpox vaccine as described hereinafter. The dimensions of the ordinary substantially cylindrical single-pointed needle used were as follows. They were of approximately 45 mm. in length, approximately 1 mm. in diameter, and had a tapered end of approximately 4.5 mm. length terminating in the usual needle point. The forked needles used were of the dimensions and contour described in the three paragraphs immediately preceding this example, with the diameters of the needles being in this case approximately 1.0 mm.

The physician performing the vaccinating operations had a great deal of previous experience and was very skillful in the technique thereof. The technique used in all the tests was the same to the extent possible. Thus, in all cases, the side of the needle employed was repeatedly pressed against the skin of the patient in the presently prescribed technique of the smallpox vaccinating art. However, there were several very significant differences in the techniques that should have reasonably been expected to result in an overwhelming advantage in the use of the single-point needles. Thus, considerably more vaccine and considerably more pressures were applied when the instrument used was a single-point needle than when it was a forked needle. The variations in amount of vaccine and number of pressures used and the actual results observed and recorded are given in the table below:

*Table*

|  | Single-Pointed Needle | Forked Needle |
|---|---|---|
| Amount of reconstituted vaccine employed. | 1 drop (approx. $1/50$ cc.) on skin. | approx. $1/1000$ cc. in fork. |
| No. of pressures of needle applied to each patient. | 16 | 4 |
| Third Day Observations: |  |  |
| Average size of vesicle in center. | .40 sq. cm | .64 sq. cm. |
| Average size of entire red area. | 7.34 sq. cm | 16.25 sq. cm. |

Thus, with substantially the same vaccinating technique, it was possible with the forked needle of the invention to obtain a vaccination wherein, at the third day, the average size of the vesicles formed on the arms of the patients was 50% greater, and the average size of the entire red area was more than 100% greater, than the respective average sizes obtained with the conventional needle. Dramatically, the vastly superior results were obtained with the forked needles despite the fact that the conventional needle utilized twenty times the amount of vaccine required with the forked needles and were pressed against the skin four times the number employed with the forked needles.

While I do not intend to be held thereto, the reasons why there is such dramatic superiority in vaccinating results provided by the forked needles of the invention may reasonably be explained as follows:

The vaccine is much more economically used by the forked needles because it is held and directed by the capillarity between the prongs to the actual point of contact between the needle points and the skin. Although the usual method of vaccination may use as much as twenty times as much vaccine as the forked needle, as demonstrated above, the small amount of vaccine used gives the better reaction. Thus, it follows that the single-pointed needle only inserts a very small amount of the total volume of the vaccine into the skin. The forked needle, holding the vaccine in the area of abrasion, actually inserts a much larger percentage, and actually a much larger absolute amount of vaccine enters the skin. The form of the bifurcated needle is such that when it is pressed with the flat surface and double-point against the skin, the skin is pushed down in a manner which holds the skin against the points in a more effective position than a single-pointed needle does, since in the latter case the pressure from the barrel of the needle pushes the skin out of the way and hence makes it rather difficult to achieve a desirable angle of contact. Stated otherwise, the construction of the forked needle, and particularly the flat face of the needle which is pressed against the skin during the vaccinating technique, actually makes much better contact than does the ordinary form of needle in which the point curves sharply inward. Additionally, of course, each pressure from the forked needle is actually a double pressure, and consequently at least twice as much vaccine is pressed against the skin. It has also been found that the extra length of the forked needle also functions better than the shorter needles usually supplied for vaccination, since a greater amount of leverage at a better angle can be applied to the needle when it is longer.

While certain specific embodiments of the invention have been disclosed hereinabove, as will be understood, many variations and embodiments of the invention may be made without departing from the spirit and scope of the invention as defined in the appended claims. For example, the needle may be made of materials other than steel and the dimensions and contour of the pronged end of the applicator may be varied considerably in certain instances depending upon the nature of the liquid to be picked up and the amount of charge desired. The material used for encapsulating the device as in one of the embodiments described herein may be other than glass, e.g., a thermoplastic resin; the attachment of the capsule to the handle end of the needle device may be by means other than the constrictions in the capsule body itself; and the weaknening of the capsule at the frangible point may be accomplished by other than a bevel. Similarly, the diaphragm closure for the vial may be other than of rubber; e.g., a synthetic elastomer.

I claim:
1. A vaccinating and testing needle package comprising:
   (1) a steel needle comprising an elongate main shank having at one extremity thereof a pair of prongs defining therebetween a slot of predetermined length, width and depth; said prongs retaining in the slot, a charge of dried material; and
   (2) an elongate glass capsule completely and hermetically enclosing said needle and being clampingly attached to said main shank thereof in a first region remote from said one extremity by means of a plurality of constrictions; said capsule having a frangible second region located between said first region and said extremity.

2. A vaccinating and testing needle package comprising:
   (1) a steel needle comprising an elongate main shank having at one extremity thereof a pair of prongs defining therebetween a slot of predetermined length, width and depth, said prongs retaining in the slot a charge of dried material; and
   (2) an elongate glass capsule completely and hermetically enclosing said needle and being clampingly attached to said main shank thereof in a first region comprising approximately the one-third of the length of said capsule remote from said one extremity by means of two constrictions; said capsule having a circumscribing frangible bevel located approximately midway of the ends of said capsule.

3. A vaccinating and testing needle for use in a multiple-pressure technique, said needle comprising:
   (A) a main shank and
   (B) a pair of spaced prongs mounted at one extremity of said main shank and extending in a common plane, said pair of spaced prongs
      (1) forming a minor extension from said shank and
      (2) defining therebetween a slot of predetermined length, width and depth open at its distal end,
      (3) each of said prongs having a pair of flat smooth surfaces disposed in substantially the direction of the common plane in which said prongs extend, whereby said prongs are adapted to be pressed laterally and simultaneously against the skin of a subject by manipulation of said shank,
      (4) each of said prongs having a flat surface that extends substantially perpendicular to said pair of flat surfaces of said prongs,
      (5) said second flat surfaces being opposed to each other and spaced apart a predetermined distance from each other to delimit said width of said slot,
      (6) said opposed second flat surfaces being integral parts of a continuous surface which defines said slot both laterally and longitudinally, whereby said slot is adapted to maintain therein by capillary action a predetermined amount of liquid,
      (7) said opposed surfaces being substantially parallel to each other throughout their lengths, whereby, in the region of said open distal end of said slot, said surfaces are spaced apart a distance substantially no greater than said predetermined distance and said slot is adapted to retain the predetermined amount of liquid substantially throughout the length of said slot and particularly at said distal open end thereof, and
      (8) each of said prongs having the peripheral surface thereof tapering inwardly in the region of said open distal end of said slot thereby to provide points on said prongs.

4. A vaccinating and testing needle for use in a multiple-pressure technique, as defined in claim 3, wherein said main shank comprises an elongate thin cylindrical steel body of a predetermined diameter, and said pair of spaced prongs comprise an integral flattened portion of said main shank extending in the same direction as said shank and having a thickness less than said diameter of said main shank and a width greater than said diameter thereof.

5. A vaccinating and testing needle for use in a multiple-pressure technique, as defined in claim 4, wherein said main shank has a diameter of about 1 mm., said flattened portion thereof is about 5 mm. long, 3 mm. wide and 1 mm. thick, said prongs are about 2 mm. long, 1 mm. wide, and 1 mm. thick, and said slot is 2 mm. long.

6. A vaccinating and testing needle assembly for use in a multiple-pressure technique, said assembly comprising:
   (A) a needle comprising:
      (1) an elongated main shank having mounted at one extremity thereof
      (2) a pair of spaced prongs having the opposed surfaces thereof disposed in substantially parallel relationship to each other and defining therebetween a slot of predetermined length, width and depth,
      (3) said prongs retaining in said slot, a charge of dried vaccinating material,
      (4) said pair of spaced prongs forming a minor extension of said shank substantially axially thereof, whereby said prongs may be pressed laterally and simultaneously against the skin of the subject by lateral manipulation of said shank; and (B) an elongate glass capsule enclosing said needle, said capsule having the ends thereof closed and the interior thereof evacuated, whereby said charge of dried vaccinating material retained in said slot of said needle is maintained hermetically sealed within said evacuated capsule,
 (1) said sealed and evacuated glass capsule being provided in a first region remote from one of said ends of said capsule with means clampingly abutting said main shank of said needle along a portion thereof which is remote from said one extremity, and maintaining said needle in rigid non-rotative relationship with respect to said glass capsule and said one extremity free of contact with the inner surface of said capsule,
 (2) said capsule having a frangible locus in a second region located between said first region of said capsule and said extremity of said needle; whereby, when said capsule is broken at said frangible locus, said second region of said capsule, extending to said one end thereof, is removable from said first region of said capsule to expose said extremity of said needle, and said first region is adapted to be used as a handle for manipulation of said shank and with it said pronged extremity.

References Cited by the Examiner
UNITED STATES PATENTS

| | | | |
|---|---|---|---|
| 585,007 | 6/97 | Rambaud | 128—253 X |
| 758,597 | 4/04 | Mulford | 128—253 |
| 2,359,550 | 10/44 | Eriksen | 128—253 |
| 2,565,865 | 8/51 | Lipman | 128—253 |
| 2,576,951 | 12/51 | Lockhart | 128—272 X |
| 2,644,452 | 7/53 | Brown | 128—272 |
| 2,779,332 | 1/57 | Corper et al. | 128—253 |
| 3,010,455 | 11/61 | Cooper | 128—253 |
| 3,042,191 | 7/62 | Riche | 206—37 |

RICHARD A. GAUDET, *Primary Examiner.*
RICHARD J. HOFFMAN, *Examiner.*